United States Patent
Canary

(10) Patent No.: US 6,402,871 B1
(45) Date of Patent: Jun. 11, 2002

(54) METHOD FOR INCREASING THE ABSORPTION CAPACITY OF SATURATING PAPERS

(75) Inventor: Stephen A. Canary, Westfield, MA (US)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 09/579,967

(22) Filed: May 26, 2000

(51) Int. Cl.⁷ .................................................. B32B 3/00
(52) U.S. Cl. .................. 156/209; 156/307.3; 156/307.7
(58) Field of Search ................................. 156/209, 219, 156/307.3, 307.4, 307.5, 307.7; 427/161, 299, 439; 162/136, 134; 428/174, 179

(56) References Cited

U.S. PATENT DOCUMENTS

| 4,154,882 A | | 5/1979 | Ungar et al. ................. 428/165 |
| 4,659,608 A | * | 4/1987 | Schulz ......................... 428/171 |

FOREIGN PATENT DOCUMENTS

| JP | 2184425 | 7/1990 |
| JP | 415053 | 1/1992 |
| JP | 551894 | 3/1993 |

OTHER PUBLICATIONS

Database WPI Section Ch, Week 199819 Derwent Publications Ltd., London, GB; Class A14, AN 1998–211671 XP002184952 and JP 10 0587607 A (Dainippon Printing), Mar. 3, 1998 abstract.

Database WPI Section Ch, Week 199729 Derwent Publications Ltd., London, GB; Class A08, AN 1997–315554 XP002184953 and JP 09 123380 A (Toppan Printing), May 13, 1997 Abstract.

Database WPI Section Ch, Week 198213 Derwent Publications Ltd., London, GB; Class A11, AN 1982–25045e XP002184954 and JP 57 031535 A (Rapko), Feb. 20, 1982 Abstract.

* cited by examiner

Primary Examiner—Michael W. Ball
Assistant Examiner—Barbara J. Musser
(74) Attorney, Agent, or Firm—Thompson Hine LLP

(57) ABSTRACT

A method for forming a saturating paper comprising the steps of selecting a sheet of paper, creating an embossed pattern of polygons on the sheet to increase the absorption capacity of the sheet, and causing a resin to contact the sheet such that the sheet absorbs at least a portion of the resin. The invention also includes a method for forming a decorative laminate including the steps of providing an overlay sheet, embossing the overlay sheet to increase the absorption capacity of the overlay sheet, and causing a resin to contact the overlay sheet such that the overlay sheet absorbs at least a portion of the resin. The method also includes the steps of locating the overlay sheet onto a decor sheet, and heating the overlay sheet and the decor sheet under pressure to bond the overlay sheet to the decor sheet.

16 Claims, 2 Drawing Sheets

METHOD FOR INCREASING THE ABSORPTION CAPACITY OF SATURATING PAPERS

BACKGROUND OF THE INVENTION

The present invention is directed to a method for treating saturating papers used in decorative laminates, and more particularly, to a method for improving the absorption capacity of saturating papers.

Decorative laminates are widely used as decorative surfaces in a variety of structures such as counter tops, kitchen and bathroom work surfaces, wall panelings, floors, cabinets, partitions, doors, coverings for furniture, and the like. A typical decorative laminate includes three separate layers: 1) a core, 2) a decorative sheet located over the core, and 3) an overlay sheet located on top of the decorative sheet. The core is typically made of a plurality of kraft paper sheets that are impregnated with a thermosetting resin. The decorative sheet, also known as the decor sheet, is typically made of a fibrous sheet. The decor sheet provides the visible surface of the finished decorative laminate and may, for example, have a printed design (such as a wood grain) or a coloring agent dispersed throughout the decor sheet. The overlay sheet is located over the decor sheet and can be made of a high quality alpha cellulose paper. The overlay sheet provides a protective layer to the decorative laminate. The core sheets, decor sheet, and overlay sheets that make up the decorative laminate are each known as a type of "saturating paper".

In order to form the decorative laminate, a number of core sheets are bonded together to form a core, and the decor sheets are located on top of the core. An overlay sheet is then typically immersed in a resin, such as a melamine-formaldehyde saturating resin, such that the overlay sheet absorbs a portion of the resin. The overlay sheet is then removed from the resin bath and the resin in the overlay sheet is allowed to at least partially dry to improve the handling characteristics of the overlay sheet. The partially-dried overlay sheet is then located on the decor sheet, and heat and pressure are applied to the laminate to bond the overlay sheet to the underlying decor sheet and core sheets. The decorative laminate is then further processed to form the finished decorative laminate product.

When the overlay sheets are immersed in the resin bath, it is desired that the overlay sheets absorb relatively large amounts of the resin. The more resin the overlay sheets absorb, the more the pre-impregnation basis weight of the overlay sheets can be reduced. Reducing the weight of the overlay sheets helps to lower the overall weight of the finished decorative laminate product.

Overlay sheets are typically "refined" during their manufacture. The overlay sheets are made from a paper slurry, and the refining process includes passing the paper slurry between a pair of plates to fibrillate the pulp fibers. The refining process increases the surface area of, and reduces the length of, the fibers in the pulp, which increases the strength and uniformity of the overlay sheets. However, the refining process decreases the absorption capacity of the resultant overlay sheets. Thus, prior art methods for increasing the absorption capacity of the overlay sheet have largely concentrated on reducing the refining of the overlay sheets during the formation of the overlay sheet. However, the reduction of the refining of the overlay sheets compromises the strength and uniformity of the overlay sheet. Accordingly, there is a need for a method for increasing the absorption capacity of overlay sheets without compromising the strength and/or uniformity of the overlay sheets.

SUMMARY OF THE INVENTION

The present invention is a method for increasing the absorption capacity of saturating papers, such as overlay sheets, without substantially decreasing the strength or uniformity of the saturating paper. The method of the present invention includes embossing the saturating papers before they are soaked with resin. The embossing process increases the absorption capacity of the saturating papers, and does not require that the refining of the saturating papers be reduced. Another advantage of the method of the present invention is that the method is practiced after the saturating papers are dried and formed (i.e. the sheets are not in their slurry form), which enables easier processing of the sheets during the absorption-increasing process.

In a one embodiment, the present invention is a method for forming a saturating paper comprising the steps of selecting a sheet of paper, creating an embossed pattern of polygons or other geometric shapes on the sheet to increase the absorption capacity of the sheet, and causing a resin to contact the sheet such that the sheet absorbs at least a portion of the resin. The invention also includes a method for forming a decorative laminate including the steps of providing an overlay sheet, embossing the overlay sheet to increase the absorption capacity of the overlay sheet, and causing a resin to contact the overlay sheet such that the overlay sheet absorbs at least a portion of the resin. The method also includes the steps of locating the overlay sheet onto a decor sheet, and heating the overlay sheet and the decor sheet under pressure to bond the overlay sheet to the decor sheet.

Other objects and advantages of the present invention will be apparent from the following description and the accompanying drawings.

DETAILED DESCRIPTION

Figure 1:
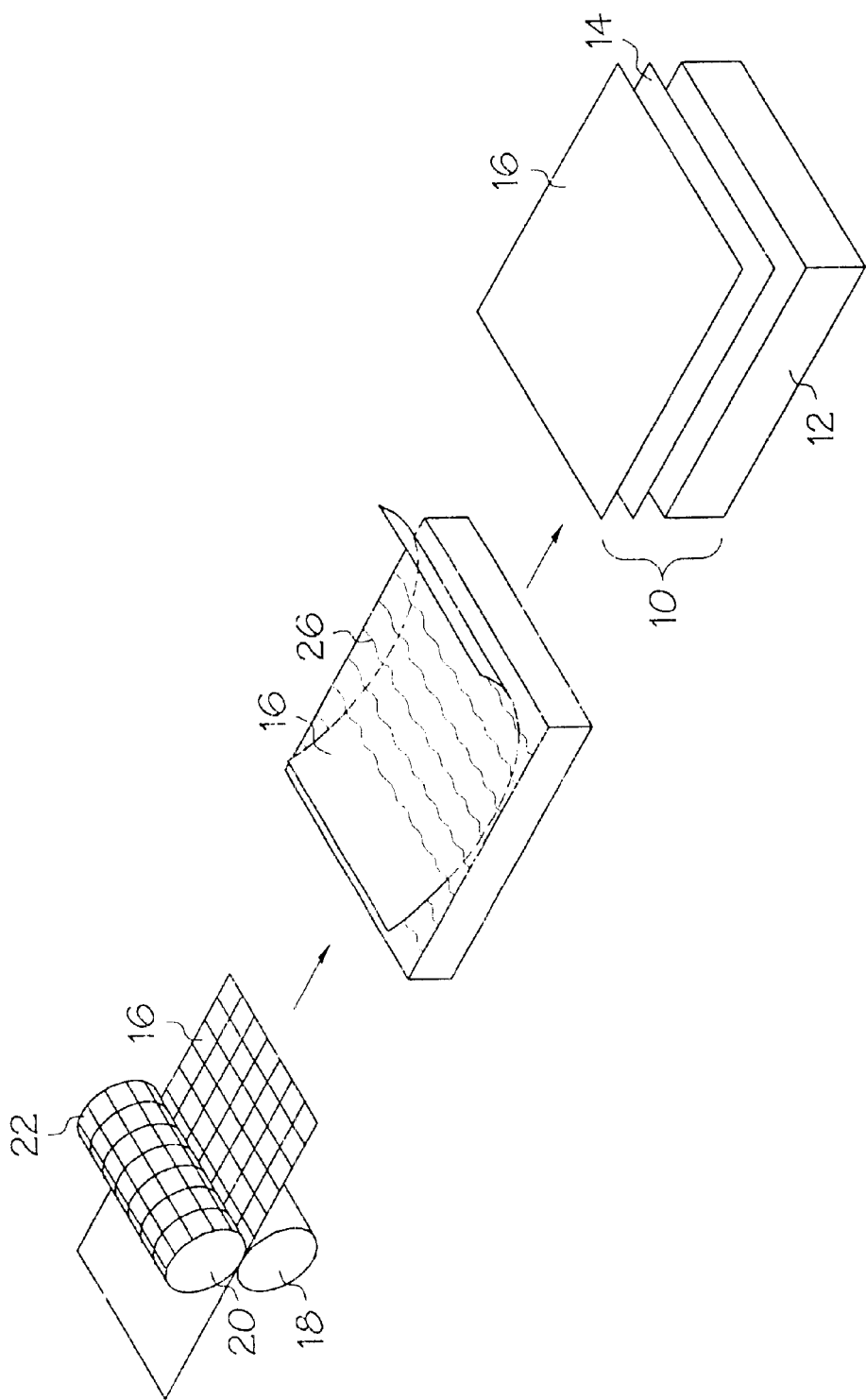
FIG. 1 is a schematic view of a process for forming decorative laminates incorporating the method of the present invention.

FIG. 1 illustrates one method for forming a decorative laminate 10. The decorative laminate 10 includes a core 12 and a decor sheet 14 located over the core 12. An overlay sheet 16 is located on top of the decor sheet 14. The overlay sheet 16 is passed through the nip of a pair of rollers 18, 20, and the top roller 20 has a raised pattern 22 thereon which embosses the overlay sheet 16. In the illustrated embodiment, the pattern 22 shown in FIG. 1 can be etched onto the roller 20 to create an embossing roller.

Figure 2:
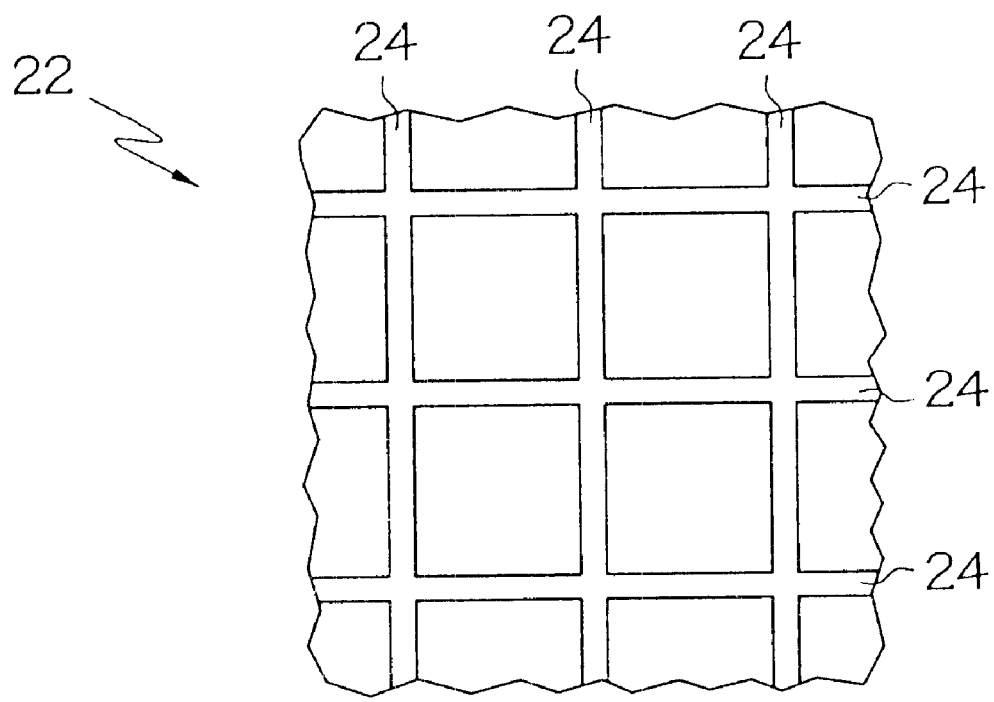
FIG. 2 is one embodiment of an embossing pattern used to emboss saturating sheets.

One example of an embossing pattern 22 which may be used is shown in FIG. 2. The pattern 22 includes a plurality of intersecting, perpendicular and parallel raised "wires" or ridges 24 that form a pattern of repeating squares. In a preferred embodiment, each ridge 24 is spaced from any adjacent, parallel ridges by anywhere from about 1 to 2 mm. Each ridge 24 preferably has a width ranging from about 0.5 mm to about 1 mm, and each ridge 24 preferably has a depth ranging from about 0.5 mm to about 1.5 mm. However, it should be understood that various methods of embossing the overlay sheet 16 may be utilized without departing from the scope of the present invention. For example, the sheet 16 may be embossed with a variety of patterns beyond those shown in FIGS. 1 and 2. Any pattern that increases the absorption capacity may be used. It has been discovered by applicants that a pattern of ridges 24 that form regular, repeated polygon shapes or other geometric shapes (such triangles, squares, rectangles, hexagons, etc.) are preferred patterns for embossing.

Various methods may be used to emboss the overlay sheet 16. For example, the overlay sheet may be embossed with an embossing plate. Furthermore, either the top 20 or bottom 18 roller may include the embossing pattern 22, or both rollers 18, 20 may include raised patterns that cooperate to emboss the sheet 16. When both rollers 18, 20 include an embossing pattern (not shown), the rollers 18, 20 are preferably aligned so that the axially-extending ridges 24 of the embossing pattern of each roller are offset from one another as they emboss a paper that is passed through the nip of the rollers. When only one roller has an embossing pattern, the non-embossing roller is preferably smooth and can be made from a wide range of materials, ranging in hardness from a relatively hard material, such as steel, to a relatively soft material, such as rubber. The embossing of the overlay sheet 16 is preferably performed after the overlay sheets 16 have been formed and generally dried.

After the overlay sheet 16 has been embossed, it is passed through a bath or reservoir of resin 26, and the sheet 16 absorbs at least part of the resin 26. The resin is preferably an aminoplast resin, such as a melamine-formaldehyde saturating resin. The saturated overlay sheet 16 is then at least partially dried and placed over a decor sheet 14 that is located on top of a core 12. The decor sheet 14, overlay sheet 16 and core 12 are then treated to form a decorative laminate. Alternately, the impregnated, saturated overlay sheet 16 may be partially dried and formed into a roll (not shown). The overlay sheet is then stored for later use, or sent to a customer. The user can then unroll the resin-impregnated overlay sheet as needed and locate it over the decor sheet 14. Once the overlay sheet 16 is located on top of the decor sheet 14, heat and pressure are applied to the laminate 10 to bond the overlay sheet 16, decor sheet 14, and core 12 together.

It should be understood that the method described herein may be used to increase the resin-absorption capacity of any paper, and is not limited to use with overlay sheets. In particular, the method of the present invention may be used in any of the saturating papers that are used to form decorative laminates. Thus, for example, the core sheets, the decor sheet, or any other sheet used in a decorative laminate may be embossed under the present invention to increase their resin-absorbing characteristics.

The pattern that is embossed on the saturating papers increases the absorption capacity of the saturating papers used in decorative laminates. It is believed that the embossing pattern mechanically reduces bonding in the Z-direction; that is, the bonds between the various fibers in the saturating papers in the direction of the thickness of the paper are reduced, and the surface area of the paper is increased. The debonding increases the absorption of the saturating papers by opening additional cells between the fibers of the paper for absorbing the resin.

As the embossing pattern 22 is passed over the saturating papers, the area on the paper located immediately below a ridge 24 is compressed, while the areas of the paper between the ridges 24 are distorted or "puffed" in the Z-direction as the ridges are pressed into the saturating papers. This results in an increase in the absorption capacity of the saturating papers. The embossed saturating paper has an "undulating" surface that is thicker is some areas (the areas compressed by a ridge 24) and thinner in other areas (the areas not compressed by a ridge 24). Other methods that cause portions of the sheet to be raised, or "puffed", such as sheet texturing, may be used without departing from the scope of the invention.

The spacing of the ridges 24 and the pressure applied by the embossing rollers 18, 20 are preferably selected to optimize the embossing of the overlay sheet 16. If not enough pressure is applied, the ridges 24 may not penetrate deeply enough into the overlay sheet 16. Correspondingly, if the spacing between the ridges 24 is too large, the spaces in the overlay sheet 16 between the ridges 24 may not be sufficiently "puffed" or distorted.

The method of the present invention enhances the absorption of saturating papers without requiring any reduction in the refining of the saturating papers. Accordingly, the strength, uniformity and clarity of the saturating papers are not compromised. Furthermore, because the embossed overlay sheets carry more resin, the underlying decor sheets may not be required to carry any resin. For example, when heat and pressure are applied to the decor sheet/overlay sheet combination, the overlay sheet 16 may donate some of its resin to the underlaying decor sheet 14. The donated resin may then be sufficient to bond the overlay sheet 16 and the decor sheet 14 together. This means that the decor sheet 14 may not need to be impregnated with resin, which helps to reduce the overall amount of resin in the decorative laminate, and also eliminates the step of applying resin to the decor sheet 14 during the manufacturing process. Finally, because the treated overlay sheets are generally thicker than conventional overlay sheets because they have absorbed more resin, they are easier to handle when they are rolled into sheets or stored. Thus, the overlay sheets formed by the present invention are less fragile and less prone to breaking when handled.

Having described the invention in detail and by reference to the preferred embodiments, it will be apparent that modifications and variations thereof are possible without departing from the scope of the invention.

What is claimed is:

1. A method for forming a decorative laminate comprising the steps of:
   providing an overlay sheet;
   embossing said overlay sheet to increase the absorption capacity of said overlay sheet;
   causing a resin to contact said embossed overlay sheet such that said overlay sheet absorbs at least a portion of said resin;
   locating said overlay sheet on a decor sheet; and
   bonding said overlay sheet to said decor sheet.

2. The method of claim 1 wherein said bonding step includes applying heat and pressure to said overlay sheet and said decor sheet.

3. The method of claim 2 wherein said decor sheet does not include any resin, and wherein said overlay sheet donates resin to said decor sheet during said bonding step to bond said overlay sheet to said decor sheet.

4. The method of claim 1 wherein said resin is caused to contact said overlay sheet by immersing said overlay sheet in a reservoir of resin.

5. The method of claim 1 further comprising the step of partially drying said overlay sheet such that said absorbed resin at least partially dries after said causing step and before said locating step.

6. The method of claim 1 further comprising the steps of providing a core and locating said decor sheet over said core before said bonding step.

7. The method of claim 1 wherein said embossing step includes embossing said overlay sheet with a pattern of polygons.

8. The method of claim 1 wherein said embossing step includes passing said overlay sheet through the nip of a pair of rollers, and wherein at least one of said rollers has a pattern of raised ridges that emboss said overlay sheet when said overlay sheet is passed through said nip.

9. The method of claim 8 wherein said pattern of raised ridges include a plurality of parallel and perpendicular straight ridges that create a pattern of squares on said roller.

10. The method of claim 9 wherein said ridges are generally uniformly spaced apart a distance of about 1 to 2 mm.

11. The method of claim 9 wherein said ridges have a depth of about 0.5 to 1.5 mm.

12. The method of claim 9 wherein said ridges have a width of about 0.5 to 1 mm.

13. The method of claim 8 wherein each of said pair of rollers include a raised pattern, and wherein said raised patterns cooperate to form an embossed pattern on said overlay sheet.

14. The method of claim 1 wherein said embossing step includes pressing a plate having a raised pattern into said overlay sheet.

15. The method of claim 1 wherein said overlay sheet is an alpha cellulose paper.

16. The method of claim 1 wherein said resin is an aminoplast resin.

\* \* \* \* \*